(12) United States Patent
Jha et al.

(10) Patent No.: US 9,772,083 B2
(45) Date of Patent: Sep. 26, 2017

(54) LIGHTING STRUCTURE FOR AN EXTERIOR VEHICLE LIGHT UNIT AND EXTERIOR VEHICLE LIGHT UNIT COMPRISING THE SAME

(71) Applicant: Goodrich Lighting Systems GmbH, Lippstadt (DE)

(72) Inventors: Anil Kumar Jha, Lippstadt (DE); Andre Hessling Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 43 days.

(21) Appl. No.: 14/657,317

(22) Filed: Mar. 13, 2015

(65) Prior Publication Data

US 2015/0267887 A1  Sep. 24, 2015

(30) Foreign Application Priority Data

Mar. 18, 2014  (EP) .................................... 14160552

(51) Int. Cl.
*F21V 7/09* (2006.01)
*F21S 8/10* (2006.01)
*B64D 47/02* (2006.01)
*B61D 29/00* (2006.01)
*B63B 45/00* (2006.01)

(52) U.S. Cl.
CPC .......... *F21S 48/1317* (2013.01); *B61D 29/00* (2013.01); *B63B 45/00* (2013.01); *B64D 47/02* (2013.01); *F21S 48/1159* (2013.01); *F21S 48/1225* (2013.01); *F21S 48/1352* (2013.01); *F21S 48/215* (2013.01); *F21S 48/2212* (2013.01); *F21S 48/234* (2013.01); *F21S 48/24* (2013.01); *B64D 2203/00* (2013.01); *F21S 48/328* (2013.01)

(58) Field of Classification Search
CPC ............... F21S 48/1317; F21S 48/2215; F21S 48/1225; F21S 48/24; B64D 47/04; B64D 47/06
USPC ................................. 362/470, 471, 472, 516
See application file for complete search history.

(56) References Cited

U.S. PATENT DOCUMENTS

| 6,340,239 B1 * | 1/2002 | Godbillon ........... F21S 48/2218 362/268 |
| 7,401,958 B2 * | 7/2008 | Okada .................... F21S 48/119 362/346 |
| 2004/0042212 A1 | 3/2004 | Du et al. |
| 2005/0094393 A1 | 5/2005 | Czajkowski |

(Continued)

OTHER PUBLICATIONS

European Search Report for Application No. 14160552.7-1757, Mailed on Oct. 7, 2014, 4 pages.

*Primary Examiner* — Andrew Coughlin
*Assistant Examiner* — Keith Delahoussaye
(74) *Attorney, Agent, or Firm* — Cantor Colburn LLP (57) ABSTRACT

A lighting structure for an exterior vehicle light unit has a light source with a principal light emission direction, at least one LED, a substantially parabolic reflector arranged to reflect light output from the light source in a first output region and to collimate the same in a primary light output direction. The light source is arranged in such a way with respect to the substantially parabolic reflector and the aspherical collimating lens that the principal light emission direction is inclined at an acute angle with respect to the primary light output direction.

20 Claims, 2 Drawing Sheets

(56) References Cited

U.S. PATENT DOCUMENTS

| | | | |
|---|---|---|---|
| 2005/0117363 A1* | 6/2005 | Yamamura | F21S 48/1145 |
| | | | 362/518 |
| 2012/0313547 A1* | 12/2012 | Barnett | F21V 29/85 |
| | | | 315/297 |
| 2013/0215634 A1* | 8/2013 | Tseng | F21S 48/1159 |
| | | | 362/516 |
| 2016/0334073 A1* | 11/2016 | Woodward | B60Q 1/20 |

* cited by examiner

LIGHTING STRUCTURE FOR AN EXTERIOR VEHICLE LIGHT UNIT AND EXTERIOR VEHICLE LIGHT UNIT COMPRISING THE SAME

FOREIGN PRIORITY

This application claims priority to European Patent Application No. 14 160 552.7 filed on Mar. 18, 2014, the entire contents of which is incorporated herein by reference.

TECHNICAL FIELD

The invention relates to exterior lighting systems for passenger transport vehicles, such as aircraft, road vehicles, ships or rail cars. In particular, it relates to a lighting structure for an exterior vehicle light unit for a passenger transport vehicle and to an exterior vehicle light unit.

BACKGROUND

Almost all passenger transport vehicles have exterior lights. They are provided for a wide variety of different purposes, such as for allowing the passengers and/or operators to view the outside, for passive visibility, for signalling purposes, etc. In the aircraft industry and other fields, exterior lights are highly regulated in terms of the light intensity distributions that are emitted from the lights.

For some exterior lights, it is desired and/or required by regulations to have a narrow opening angle of the emitted light. In other words, it is a design goal for some exterior lights to achieve a highly collimated output light beam. Previous approaches have not yielded good results of collimation at acceptable sizes of the optical structures needed for achieving the collimation.

Accordingly, it would be beneficial to provide a lighting structure for an exterior vehicle light unit that achieves an improved compromise between the degree of collimation and the space required for the lighting structure. Further, it would be beneficial to provide an exterior vehicle light unit making use of such improved lighting structure. It would also be beneficial to provide a passenger transport vehicle with such improved exterior vehicle light unit.

SUMMARY

Exemplary embodiments of the invention include a lighting structure for an exterior vehicle light unit, such as an exterior light unit of an aircraft, road vehicle, ship or rail car, the lighting structure comprising a light source with a principal light emission direction, the light source comprising at least one LED, a substantially parabolic reflector arranged to reflect light output from the light source in a first output region and to collimate the same in a primary light output direction, the substantially parabolic reflector corresponding to a section of a paraboloid and the first output region containing the principal light emission direction, and an aspherical collimating lens arranged to refract light output from the light source in a second output region different from the first output region and to collimate the same in the primary light output direction. The light source is arranged in such a way with respect to the substantially parabolic reflector and the aspherical collimating lens that the principal light emission direction is inclined at an acute angle with respect to the primary light output direction.

The combination of the parabolic reflector, the aspherical collimating lens and the inclination at an acute angle between the principal light emission direction and the primary light output direction work together in achieving a space-efficient optical structure that provides a highly collimated output light beam. Providing both the parabolic reflector and the aspherical collimating lens allows for a close arrangement of two collimating optical elements that do not interfere with each other. The two optical elements affect and collimate a large portion of the light output by the light source, without leading to excessive space constraints. Both the parabolic reflector and the aspherical collimating lens have their focus in the primary light output direction.

Providing only one of the parabolic reflector and the aspherical collimating lens would require much more space for collimating the same amount of light output by the light source. In other words, for reaching the same amount of collimated light with one single optical element, an extended parabolic reflector or an extended aspherical collimating lens would be required, whose dimensions would be larger than the combination of the parabolic reflector and the aspherical collimating lens of the present invention. This can be better understood when looking at the example of collimating light from a light source, such as a single LED, that emits light in an output range of 180° in a cross-sectional plane. When looking at three dimensions, such a light source emits light over a solid angle of $2\pi$. When placing only an aspherical collimating lens in front of the light source, this aspherical collimating lens would have to be placed orthogonal to the principal light emission direction of the light source and would have to have a very large extent for collimating a large portion of the emitted light. Also, when only a parabolic reflector is used for collimation, this parabolic reflector would either have to surround the light source in all emission directions and/or have a large extension for capturing a large portion of the emitted light for collimation.

The inclination of the principal light emission direction of the light source with respect to the primary light output direction has a two-fold effect. First, the inclination ensures that both the parabolic reflector and the aspherical collimating lens collimate a very substantial portion of the light output by the light source. The inclination allows for a close and thus space-efficient positioning of the parabolic reflector and the aspherical collimating lens, while ensuring that the two optical elements do not interfere with each other for a very large portion of the light output from the light source. In other words, two mutually independent collimation actions may be preformed by the parabolic reflector and the aspherical collimating lens, resulting in the collimation of a large portion of the light output from the light source in a space-efficient manner.

This can be better understood when looking at the extremes. If the principal light emission direction were to correspond to the primary light output direction, some light would pass by the aspherical collimating lens on all sides thereof, such that the parabolic reflector would have to surround the aspherical collimating lens on all sides for capturing the remainder of the light. Accordingly, the inclination eliminates the need of placing the parabolic reflector around the aspherical collimating lens on all sides. If the principal light emission direction were orthogonal to the paraboloid axis, a large portion of the light reflected by the parabolic reflector would hit the aspherical collimating lens, where it would be re-directed and no longer be in the primary light output direction.

The second effect of the inclination is an increase in the average distance the light travels between the light source and the parabolic reflector. This in turn has a beneficial effect on the degree of collimation, as is explained as follows. No light source is ideal, i.e. no light source is concentrated in a geometrical point. Accordingly, even when reflected by an ideal parabolic reflector, a realistic light source produces an image, i.e. a non-perfectly collimated beam. This effect is the smaller, the farther away the light source is from the parabolic reflector. Accordingly, the inclination helps in keeping the imperfection of the collimated beam low.

The term principal light emission direction refers to the direction of highest relative light intensity of the light source. A typical LED has its direction of highest relative light intensity normal to its mounting plane. In other words, when an LED is mounted to a supporting structure in a flat manner, the principal light emission direction is generally orthogonal to the supporting structure.

The term substantially parabolic reflector indicates that the reflector does not have to be parabolic in a strict geometrical sense. The reflector may be manufactured with production tolerances. The substantially parabolic reflector is a reflector shape that is suitable for collimating or nearly collimating light, emitted from a focal point thereof. The substantially parabolic reflector is a section of a paraboloid, i.e. a portion of a paraboloid. In particular, the substantially parabolic reflector may be a section of the paraboloid not containing the vertex of the paraboloid. The paraboloid has a paraboloid axis. The direction of the paraboloid axis corresponds to the primary light output direction, i.e. the light rays in the primary light output direction are along or parallel to the paraboloid axis.

The term primary light output direction refers to the main light output direction of the lighting structure. It refers to the desired direction of the collimated output light beam. As the output light beam is not perfectly collimated in realistic use situations, the term primary light output direction may also be referred to as the output direction of highest relative light intensity.

The term aspherical collimating lens refers to a lens whose surface is not spherical, i.e. not a portion of a sphere, and that is suitable to collimate light emitted from a focal point thereof.

The term to collimate light is used to denote the effect of bundling light in a common output direction, i.e. in the primary light output direction. As explained above, a perfect collimation with all light leaving the lighting structure in the common output direction is not realistic. Due to the imperfection of the light source and due to the manufacturing tolerances of the parabolic reflector and the aspherical collimating lens, the output light beam will not be perfectly collimated. The term to collimate light does not require a perfect collimation, i.e. a perfect aligning of the light rays. Instead, it refers to an alignment of the output light that is possible under realistic use conditions.

The principal light emission direction of the light source, i.e. the emission direction of highest light intensity in the absence of all optical elements, is at an acute angle, i.e. at an angle of more than 0° and less than 90°, with respect to the primary light output direction. In other words, the principal light emission direction is inclined with respect to the primary light output direction. In yet other words, the principal light emission direction is neither aligned with nor orthogonal to the primary light output direction.

The terms first output region and second output region refer to angular regions of the light output from the light source. Generally, the light source has a light intensity distribution over a particular solid angle. The first output region refers to a first portion of that particular solid angle, while the second output region refers to a second portion of that solid angle. In other words, the light for which the parabolic reflector is the first optical element along its path is the light output from the light source in the first output region. Analogously, the light for which the aspherical collimating lens is the first optical element along its path is the light output from the light source in the second output region.

The light source is arranged with respect to the parabolic reflector and with respect to the aspherical collimating lens in such a way that it is positioned in the focal point of the parabolic reflector and the aspherical collimating lens. In other words, the parabolic reflector and the aspherical collimating lens are positioned in such a way with respect to each other that their focal points coincide. In this way, both optical elements achieve a high degree of collimation. For an extended light source, the center of the light source or another portion of the light source may be positioned in the focal point of the parabolic reflector and the aspherical collimating lens. The focal lengths of the parabolic reflector and the aspherical collimating lens may be the same. However, it is also possible that the parabolic reflector and the aspherical collimating lens have differing focal lengths.

In a particular embodiment, the light reflected by the parabolic reflector passes by the aspherical collimating lens. In other words, the light output from the light source in the first output region is not affected by the aspherical collimating lens. Analogously, the light refracted by the aspherical collimating lens may pass by the parabolic reflector. In other words, the light in the second output region is not affected by the parabolic reflector.

According to a further embodiment, the principal light emission direction is inclined with respect to the primary light output direction at an angle of more than 60° and less than 90°, in particular at an angle of between 70° and 80°. These values of inclination provide for a particularly good compromise in terms of distributing the light between the parabolic reflector and the aspherical collimating lens, achieving a small overall size of the lighting structure and achieving a high degree of collimation in the primary light output direction.

According to a further embodiment, the principal light emission direction is inclined with respect to the principal light emission direction at such an angle that the average distance from the light source to the substantially parabolic reflector and the aspherical collimating lens is maximized. In this way, the imperfection of the output light beam, i.e. of the collimated light beam in the primary light output direction, due to the extended nature of the light source is minimized for a given maximum size of the lighting structure. For the calculation of the average distance, the distance between the light source and the parabolic reflector/aspherical collimating lens may be weighed at every point with the light intensity distribution of the light source. In other words, the light intensity distribution of the light source may be multiplied with the distribution of the distance between the light source and the parabolic reflector/aspherical collimating lens. The integral of this multiplied distribution may be maximized.

According to a further embodiment, the first output region has an opening angle of between 65° and 95°, in particular of between 75° and 85°, in a cross-sectional plane orthogonal to the aspherical collimating lens and going through the light source. In this way, a large portion of the light from the light source is reflected by the parabolic reflector, taking advantage of the larger distance between the light source and the parabolic reflector (as compared to the distance between the light source and the aspherical collimating lens), resulting in a greater degree of collimation. Also, the extent of the parabolic reflector is kept at an acceptable level. For an extended light source, the cross-sectional plane may run through the center of the light source. The term plane orthogonal to the aspherical collimating lens refers to the plane orthogonal to a center plane of the extended aspherical collimating lens.

According to a further embodiment, the second output region has an opening angle of between 40° and 70°, in particular of between 50° and 60°, in a cross-sectional plane orthogonal to the aspherical collimating lens and going through the light source. In this way, comparable portions of the light output may be affected by the parabolic reflector and the aspherical collimating lens. In other words, the difference between the light yield in the first output region and the light yield in the second output region is less than an order of magnitude, i.e. the light yield in the second output region is more than 10% of the light yield in the first output region. The aspherical collimating lens contributes a substantial portion of light conditioning without adding large space requirements and without interfering with the reflection action by the parabolic reflector. For an extended light source, the cross-sectional plane may run through the center of the light source. The term plane orthogonal to the aspherical collimating lens refers to the plane orthogonal to a center plane of the extended aspherical collimating lens.

The first output region may be adjacent to the second output region. In other words, there may be a border line, on the one side of which the light hits the parabolic reflector and on the other side of which the light hits the aspherical collimating lens.

According to a further embodiment, the first output region has an opening angle of between 140° and 180° in a second cross-sectional plane orthogonal to the above mentioned cross-sectional plane and miming through the principal light emission direction.

According to a further embodiment, the second output region has an opening angle of between 140° and 180° in a second cross-sectional plane orthogonal to the above mentioned cross-sectional plane and running through the paraboloid axis.

According to a further embodiment, the aspherical collimating lens is a Fresnel lens. In this way, the collimating may be achieved with a lens of low volume, keeping the space requirement for the lighting structure low.

According to a further embodiment, the lighting structure may comprise a substantially spherical reflector for reflecting the light output from the light source in a third output region back towards the light source. The spherical reflector reflects light back to the light source where it is again reflected. This second reflection at the light source re-directs at least some of the light towards the parabolic reflector and/or the aspherical collimating lens. This re-direction of the light at the light source may take place, because the light source may have a non-spherical reflecting surface or other optical properties that allow for a re-direction in another way. Accordingly, the spherical reflector increases the light yield of the lighting structure as compared to the provision of the parabolic reflector and the aspherical collimating lens only. Stated in different terms, the spherical reflector increases the angular output range of the light source that can be used for producing the collimated beam. It would not be possible to use the same amount of light with the parabolic reflector and the aspherical collimating lens only, given the same available space. In particular, the spherical reflector may make use of a portion of the light output from the light source that could not be used by the integrated combined approach of parabolic reflector and aspherical collimating lens, because this portion of the light would be affected by both the parabolic reflector and the aspherical collimating lens and would therefore not be collimated. It is pointed out that the spherical reflector is an efficient means for increasing the total output light intensity, but is not a necessary feature of the present invention.

The term substantially spherical reflector is used to denote that the reflector does not have to be spherical in a strict geometrical sense. The reflector may be manufactured with production tolerances. The substantially spherical reflector is a section of a sphere.

According to a further embodiment, the first output region is between the second output region and the third output region. In particular, the first output region may be between the second output region and the third output region in the cross-sectional plane orthogonal to the aspherical collimating lens and going through the light source. When looking at a solid angle of $2\pi$, into which the light source may emit light, it is possible that the first output region completely separates the second and third output regions. It is also possible that the first and third output regions jointly surround the first output region.

According to a further embodiment, the third output region has an opening angle of between 30° and 60°, in particular of between 40° and 50°, in a cross-sectional plane orthogonal to the aspherical collimating lens and going through the light source. For an extended light source, the cross-sectional plane may run through the center of the light source. The term plane orthogonal to the aspherical collimating lens refers to the plane orthogonal to a center plane of the extended aspherical collimating lens.

According to a further embodiment, the substantially parabolic reflector and the substantially spherical reflector are formed in an integrated manner. The parabolic reflector and the spherical reflector may be formed from a single piece. It is also possible that they form a pre-assembled unit from originally separate pieces. In this way, it can be ensured that no light is lost in a transition region between the parabolic reflector and the spherical reflector.

According to a further embodiment, the light source consists of exactly one LED. One single LED has a behavior that is very close to a perfect light source, i.e. a light source that is concentrated in one point. In this way, a high degree of collimation can be achieved, while the illumination capacity of one modern LED is sufficient for numerous applications. It is, however, also possible that the light source comprises a plurality of LED's or a combination of one or more LED's with other light emitting devices.

Exemplary embodiments of the invention further include an exterior vehicle light unit, such as an exterior light unit of an aircraft, road vehicle, ship or rail car, comprising at least one lighting structure, as described in any of the embodiments above, at least one mounting structure, with each of the at least one lighting structure being mounted to at least one of the at least one mounting structure, and a lens cover. Above modifications and advantages equally apply to the exterior vehicle light unit.

It is possible that the exterior vehicle light unit has exactly one lighting structure. The exterior vehicle light unit may then have exactly one mounting structure or a plurality of mounting structures to which the lighting structure is mounted. It is also possible that the exterior vehicle light unit has exactly one mounting structure. One or more lighting structure may then be mounted to the mounting structure. It is also possible that the exterior vehicle light unit has a plurality of lighting structures and a plurality of mounting structures. Each of the lighting structures may then be mounted to exactly one or to a subset of the mounting structures.

The exterior vehicle light unit is an enclosed system that may be readily applied to a vehicle during assembly. The mounting structure and the lens cover protect the sensitive lighting structure. In addition, a housing structure may be provided for further protection. In other words, the lighting structure is placed in a protected interior space of the exterior vehicle light unit. It is possible to replace existing exterior vehicle light units with the exterior vehicle light unit, as described above.

According to a further embodiment, the lens cover has a sawtooth contour on the inner surface. This contour allows for the light exiting the light unit at a low angle. Internal reflection at the lens cover can be minimized or eliminated. The sawtooth contour may consist of a plurality of 90° angles. However, it is also possible to use a contour with different angles.

According to a further embodiment, the at least one mounting structure is a multi-layer structure, comprising for example a structural support layer and an electric connection layer, such as a printed circuit board.

According to a further embodiment, the at least one mounting structure is formed as a heat discharge structure. In this way, the heat produced by the light source during operation may be led away from the light source and discharged. Efficient cooling of the light source can be provided without interfering with the optical properties of the lighting structure. Efficient cooling provides for higher optical efficiency and reliability. The heat discharge structure may comprise a plurality of cooling ribs or cooling fins, creating cooling channels therebetween. However, other geometries of the heat discharge structure are possible as well.

In the case of an aircraft, the exterior vehicle light unit may be a landing light, such as a belly faring landing light, a take off light, a taxi light, a runway turn off light, or any other kind of directed exterior light.

The exterior vehicle light unit may be smaller than 10 cm in all three dimensions. However, other sizes are possible as well, depending on the light intensity and space requirements.

Exemplary embodiments of the invention further include a vehicle, such as an aircraft, a road vehicle, a ship or a rail car, comprising at least one exterior vehicle light unit, as described in accordance with any of the embodiments above. Above modifications and advantages equally apply to the aircraft, road vehicle, ship or rail car.

BRIEF DESCRIPTION OF THE DRAWINGS

Embodiments of the invention are described in greater detail below with reference to the figures, wherein.

DETAILED DESCRIPTION

Figure 1:
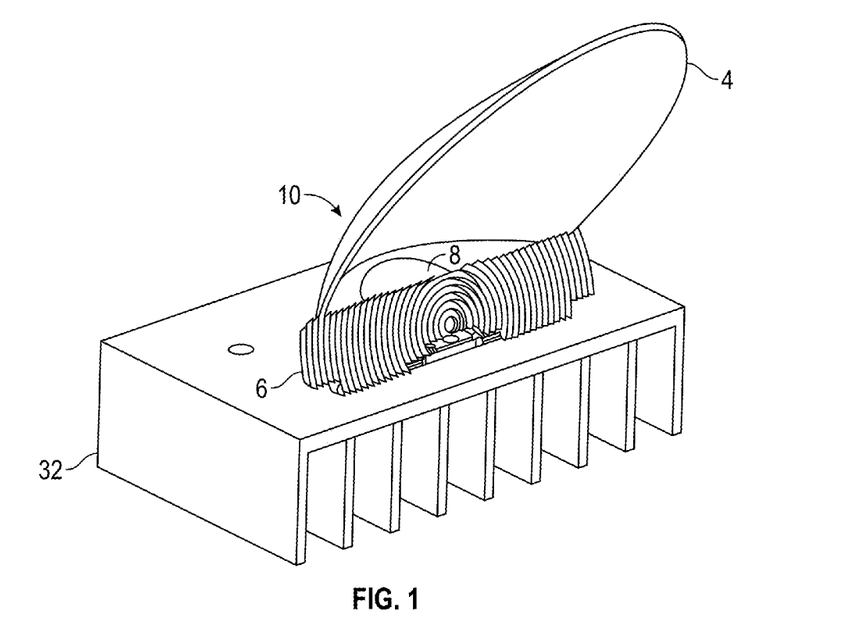
FIG. 1 shows a perspective view of an exemplary embodiment of a lighting structure in accordance with the invention, the lighting structure being mounted on a mounting structure.

FIG. 1 shows a perspective view of a lighting structure 10 in accordance with an exemplary embodiment of the invention. This lighting structure 10 is shown in combination with a mounting structure 32. The lighting structure 10 has a parabolic reflector 4, an aspherical collimating lens 6, and a spherical reflector 8.

The parabolic reflector 4 is a section of a paraboloid. As can be seen from FIG. 1, the parabolic reflector 4 has a dish-like shape. The dish-like shape is cut off towards the mounting structure 32. Only a small portion of the spherical reflector 8 can be seen in the perspective viewing directing of FIG. 1. The spherical reflector 8 and the parabolic reflector 4 are formed in an integrated manner in the exemplary embodiment of FIG. 1, with a transition region being interposed between the parabolic reflector 4 and the spherical reflector 8. As will become apparent from the discussion of the functioning of the exemplary embodiment of FIG. 1, which is given with respect to FIG. 2, this transition region has no effect on the optical properties of the lighting structure 10.

The aspherical collimating lens 6 is a Fresnel lens. The aspherical collimating lens 6 has a width that is comparable to the width of the parabolic reflector 4. The width of the aspherical collimating lens 6 is larger than the height thereof, in particular about 3-5 times as large.

Both the aspherical collimating lens 6 and the reflector structure, consisting of the parabolic reflector 4 and the spherical reflector 8, are mounted to the mounting structure 32. The mounting structure 32 has a plurality of cooling ribs on the side facing away from the lighting structure 10. These cooling ribs serve the purpose of carrying away and discharging the heat generated in operation by the lighting structure 10.

The lighting structure 10 further comprises an LED, which cannot be seen in the perspective viewing direction of FIG. 1. It is arranged on the mounting structure 32 between the aspherical collimating lens 6 and the spherical reflector 8. The details of the positioning of the LED will be explained with respect to FIG. 2.

Figure 2:
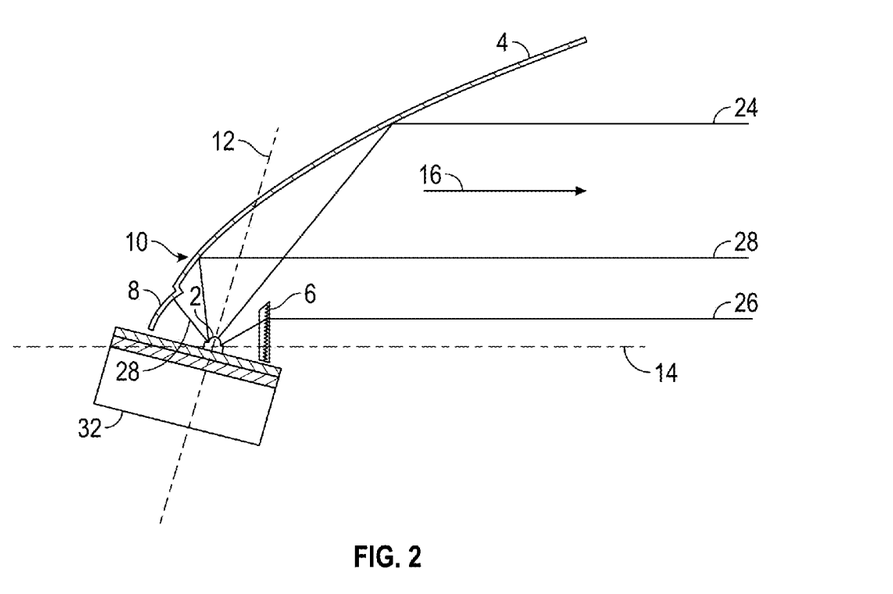
FIG. 2 shows a cross-sectional view of the lighting structure and the mounting structure of FIG. 1.

FIG. 2 shows a cross-sectional view through the lighting structure 10 and the mounting structure 32 of FIG. 1. The cross-sectional plane of FIG. 2 is orthogonal to the aspherical collimating lens 6 and runs through the LED 2. In this way, the cross-sectional plane of FIG. 2 is parallel to the main surfaces of the cooling ribs of the mounting structure 32. In FIG. 2, the same elements as in FIG. 1 are shown. In addition, the LED 2 is shown, which was blocked from being seen by the aspherical collimating lens 6 in the viewing direction of FIG. 1.

The parabolic reflector 4 is a portion of a paraboloid. The paraboloid has a paraboloid axis 14, through which the cross-sectional plane of FIG. 2 runs. In the cross-sectional view of FIG. 2, the parabolic reflector 4 has a parabolic shape, i.e. it constitutes a portion of a parabola. If this parabola were to be continued beyond the ends of the parabolic reflector 4, the paraboloid axis 14 would be the axis of symmetry of this parabola. However, the parabolic reflector 4 only extends on one side of the paraboloid axis 14 and does not reach the same. In other words, the parabolic reflector 4 does not include the vertex of the paraboloid it is related to. In particular, the point of the parabolic reflector 4 closest to the paraboloid axis 14 is about one focal length away from the paraboloid axis 14.

The LED 2 is placed in the focal point of the parabolic reflector 4. This means that all light emitted from the LED 2 will be reflected in the same direction by the parabolic reflector 4 (under the simplifying assumption that the LED 2 were a point light source). This direction of reflection is the primary light output direction 16. In the drawing plane of FIG. 2, the primary light output direction 16 is towards the right.

The LED 2 is mounted to the mounting structure 32. The cross-sectional plane of FIG. 2 cuts through the mounting structure 32 at a point where there is no cooling rib. Accordingly, the cooling rib is shown in a non-shaded manner. However, as can be seen from FIG. 2, the cross-sectional plane cuts through a connection between two cooling ribs, with this connection having a two-layered structure. The lower layer serves to structurally support the lighting structure 10 and to connect the cooling ribs. The upper layer contains the circuitry that provides the LED 2 with the necessary electric energy and control. It is pointed out that the mounting structure 32 may have any suitable form and may have a different number and configuration of layers, as long as a supply of electric energy to the LED 2 is ensured.

The top surface of the mounting structure 32 is inclined with respect to the paraboloid axis 14, the details of which inclination and the effect of which is being discussed below. As the primary light output direction 16 contains all lines parallel to the paraboloid axis 14, i.e. all lines to the right in the drawing plane of FIG. 2, the top surface of the mounting structure 32 is also inclined with respect to the primary light output direction 16.

The aspherical collimating lens 6 is mounted to the mounting structure 32 in an inclined manner. In particular, the aspherical collimating lens 6 is placed orthogonal to the paraboloid axis 14, with the paraboloid axis 14 running to an optical center point of the aspherical collimating lens 6. The expression optical center point refers to the point of the aspherical collimating lens 6 where light coming from the focal point thereof is not refracted. When seen from the mounting structure 32, the aspherical collimating lens 6 has a larger height-wise extension above the paraboloid axis 14 than below the paraboloid axis 14. In the exemplary embodiment of FIG. 2, the extension above the paraboloid axis 14 is about 3-5 times the extension below the paraboloid axis.

The aspherical collimating lens 6 is a Fresnel lens, which can be seen from the riffled or sawtooth-like contour on the inner side thereof. By using a Fresnel lens, a collimation is achieved with a much smaller lens volume than with a collimating lens having a differentiable surface.

The spherical reflector 8 is placed between the mounting structure 32 and the parabolic reflector 4 in the cross-sectional plane of FIG. 2. The spherical reflector 8 consists of about ⅛ of a full circle in the cross-sectional plane of FIG. 2. The spherical reflector 8 and the parabolic reflector 4 are formed as one piece in an integrated manner, which one piece is mounted to the mounting structure 32.

The LED 2 has a principal light emission direction 12, which is normal to the lateral mounting plane of the LED 2. It is also normal to the upper surface of the mounting structure 32. Most common LEDs have their principal light emission direction normal to their mounting plane. In the exemplary embodiment of FIG. 2, the LED may have a Gaussian or Lambertian or another light intensity distribution, with the highest relative light intensity in the principal light emission direction 12.

The principal light emission direction 12 is angled with respect to the paraboloid axis 14 at an angle of about 75°. This in turn means that the upper surface of the mounting structure 32 is angled at an angle of about 15° with respect to the paraboloid axis 14. As the paraboloid axis 14 coincides with the primary light output direction 16 of the lighting structure 10, the principal light emission direction 12 is angled at an angle of 75° with respect to the primary light output direction 16. In other words, the angle of inclination of the principal light emission direction 12 is measured as the angle between the principal light emission direction 12 of the LED 2 and the direction of the collimated output light beam of the lighting structure 10.

It is pointed out that it is not necessary that the upper surface of the mounting structure 32 is inclined with respect to the paraboloid axis 14. It is also possible that the LED 2 is placed on the mounting structure 32 in an angled manner.

The collimation operation of the lighting structure 10 of FIG. 2 is now described with respect to three exemplary light rays 24, 26 and 28. The first light ray 24 is emitted by the LED 2, reflected by the parabolic reflector 4 and re-directed towards the right in the drawing plane of FIG. 2. As the direction towards the right in the drawing plane of FIG. 2 is the primary light output direction 16 of the lighting structure 10, this first light ray 24 contributes to the beam of collimated output light. Equally, all other light rays emitted from the LED 2 and passing between the aspherical collimating lens 6 and the spherical reflector 8 are also reflected towards the right by the parabolic reflector 4. The angle between the aspherical collimating lens 6 and the spherical reflector 8 is referred to as a first output region of the LED 2. As is apparent, FIG. 2 only shows a cross-sectional view. Hence, the first output region covers a solid angle in three dimensions. In the cross-sectional plane of FIG. 2, the first output region starts at an angle of 55° and ends at an angle of 135° with respect to the mounting structure 32, i.e. it has an opening angle of 80°.

The second light ray 26 is emitted from the LED 2, refracted by the aspherical collimating lens 6 and output from the lighting structure 10 towards the right in the drawing plane of FIG. 2, i.e. output in the primary light output direction 16. Accordingly, the second light ray 26 also contributes to the collimated light beam output by the lighting structure 10. As the LED 2 is placed in the focal point of the aspherical collimating lens 6, all other light rays emitted by the LED 2 and hitting the aspherical collimating lens 6 are also refracted towards the right in the drawing plane of FIG. 2. All of these light rays are referred to be in a second output region of the LED 2. Again, as the lighting structure 10 is a three-dimensional structure, the second output region covers a solid angle. In the cross-sectional plane of FIG. 2, the light rays emitted by the LED 2 in an angle from 0° to 55° with respect to the mounting structure 32 are refracted by the aspherical collimating lens 6.

The third light ray 28 is emitted from the LED 2 towards the spherical reflector 8, where it is reflected back to the LED 2. The LED 2 is no ideal reflector and has no regular reflective surface. Therefore, the light ray 28 is reflected from the LED 2 towards the top in the drawing plane of FIG. 2. From there, it is reflected by the parabolic reflector 4 towards the right in the drawing plane of FIG. 2. In this way, light that would be lost for the collimated output beam in the absence of spherical reflector 8, can be redirected in the primary light output direction 16. It is pointed out that the third light ray 28 is an exemplary light ray only. The LED 2 diffuses the light reflected from the spherical reflector 8 and re-directs it towards both the parabolic reflector 4 and the aspherical collimating lens 6.

Figure 3:
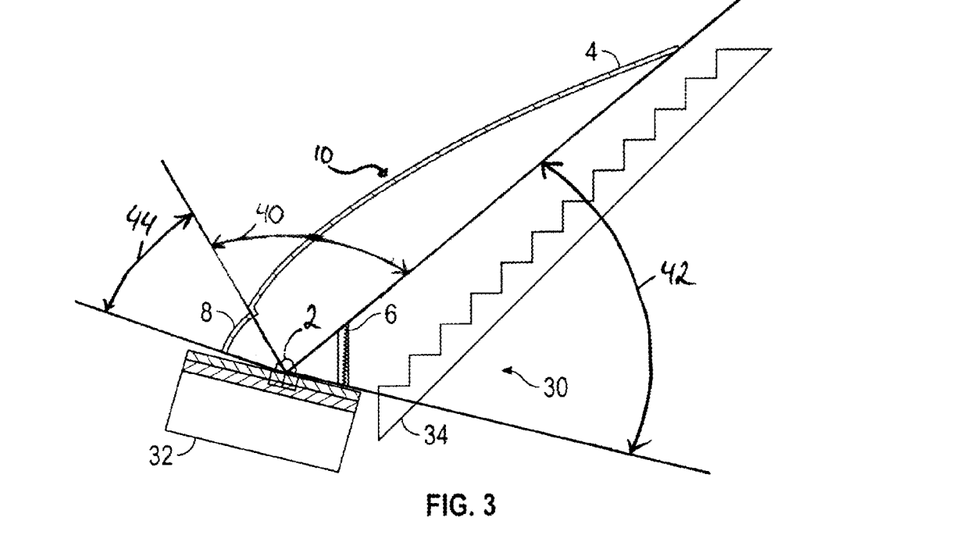
FIG. 3 shows a cross-sectional view of an exemplary embodiment of an exterior vehicle light unit in accordance with the invention.

FIG. 3 shows a cross-sectional view through one of a plurality of lighting structures 10 of an exemplary exterior vehicle light unit 30 in accordance with the invention. The elements identical to the corresponding elements in FIGS. 1 and 2 are designated with the same reference numerals. Again, the lighting structure 10 comprises the LED 2, the parabolic reflector 4, the aspherical collimating lens 6, and the spherical reflector 8, which are arranged in the same manner as shown and discussed in FIG. 2. Also, the mounting structure 32 corresponds in cross-section to the mounting structure 32 of FIG. 2. In FIG. 3, the first output region is indicated with reference numeral 40, the second output region is indicated with reference numeral 42, and the third output region is indicated with reference numeral 44.

The exterior vehicle light unit 30 further comprises a lens cover 34. The lens cover 34 has a sawtooth contour on the inner surface thereof and a plane outer surface. This lens cover 34 protects the lighting structure 10 from exterior influences, when the exterior vehicle light unit 30 is arranged in an exterior portion of the vehicle, such as along an outside surface of an aircraft.

The sawtooth inner surface of the lens cover 34 allows for an introduction of the collimated light into the lens cover 34 without reflection or refraction. The light from the LED 2, which is directed towards the right in the drawing plane of FIG. 3 by the parabolic reflector 4 and the aspherical collimating lens 6 hits the inner surface of the lens cover 34 at a right angle. Accordingly, no reflection or refraction takes place. In this way, all light rays hit the outer surface of the lens cover 34 at the same angle, resulting in the same refraction at the outer surface, such that the collimated beam is able to leave the exterior vehicle light unit 30 in a collimated manner.

It is pointed out that an additional housing (not shown) may be provided around the parabolic reflector 4 and the spherical reflector 8, protecting these optical elements and their attachment points to the mounting structure 32 from external influences. The housing may also be arranged around and protect all or part of the mounting structure 32.

Figure 4:
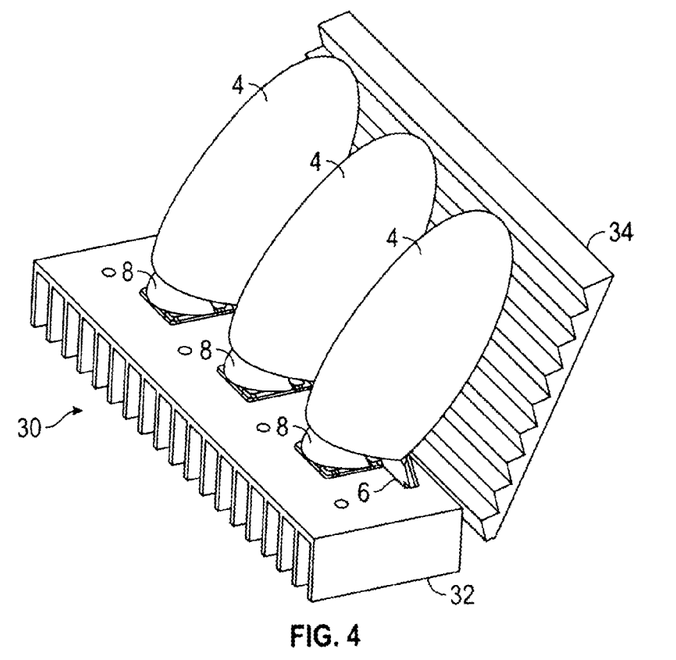
FIG. 4 shows a perspective view of the exterior vehicle light unit of FIG. 3.

In FIG. 4, a three-dimensional perspective view of the exterior vehicle light unit 30 of FIG. 3 is shown. As can be seen, the exterior vehicle light unit comprises three lighting structures, each of which having an LED (not visible in the viewing direction of FIG. 4), a parabolic reflector 4, an aspherical collimating lens 6, and a spherical reflector 8. The three lighting structures are all mounted to one single mounting structure 32. In this way, three collimated beams are produced by the three lighting structures, re-enforcing each other and adding up to an overall increased light intensity in the primary light output direction.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Lighting structure for an exterior vehicle light unit, the lighting structure comprising:
   a light source with a principal light emission direction, the light source comprising at least one LED, with the principal light emission direction being the direction of highest light intensity of the light source,
   a substantially parabolic reflector arranged to reflect light output from the light source in a first output region and to collimate the same in a primary light output direction, the substantially parabolic reflector corresponding to a section of a paraboloid and the first output region containing the principal light emission direction, and
   an aspherical collimating lens arranged to refract light output from the light source in a second output region different from the first output region and to collimate the same in the primary light output direction, with the light output from the light source in the second output region directly hitting the aspherical collimating lens,
   wherein the light source is arranged with respect to the substantially parabolic reflector and the aspherical collimating lens so that the principal light emission direction is inclined at an acute angle with respect to the primary light output direction, with light emitted by the light source in the principal light emission direction being re-directed at the substantially parabolic reflector by more than 60° and less than 90°.

2. Lighting structure according to claim 1, wherein light emitted by the light source in the principal light emission direction is re-directed at the substantially parabolic reflector by between 70° and 80°.

3. Lighting structure according to claim 1, wherein the principal light emission direction and the primary light output direction are angled with respect to each other so that the average distance from the light source to the substantially parabolic reflector and the aspherical collimating lens is maximized.

4. Lighting structure according to claim 1, wherein the first output region corresponds to a first angular range of between 65° and 95°, when seen from the light source, in a cross-sectional plane orthogonal to the aspherical collimating lens and going through the light source.

5. Lighting structure according to claim 1, wherein the second output region corresponds to a second angular range of between 40° and 70°, when seen from the light source, in a cross-sectional plane orthogonal to the aspherical collimating lens and going through the light source.

6. Lighting structure according to claim 1, wherein the aspherical collimating lens is a Fresnel lens.

7. Lighting structure according to claim 1, further comprising:
   a substantially spherical reflector for reflecting the light output from the light source in a third output region back towards the light source.

8. Lighting structure according to claim 7, wherein the first output region is between the second output region and the third output region.

9. Lighting structure according to claim 8, wherein the third output region corresponds to a third angular range of between 30° and 60°, when seen from the light source, in a cross-sectional plane orthogonal to the aspherical collimating lens and going through the light source.

10. Lighting structure according to claim 7, wherein the third output region corresponds to a third angular range of between 30° and 60°, when seen from the light source, in a cross-sectional plane orthogonal to the aspherical collimating lens and going through the light source.

11. Lighting structure according to claim 7, wherein the substantially parabolic reflector and the substantially spherical reflector are formed in an integrated manner.

12. Lighting structure according to claim 7, wherein the third output region corresponds to a third angular range of between 40° and 50°, when seen from the light source, in a cross-sectional plane orthogonal to the aspherical collimating lens and going through the light source.

13. Lighting structure according to claim 1, wherein the light source consists of exactly one LED.

14. Exterior vehicle light unit according to claim 13, wherein the lens cover has a sawtooth contour on the inner surface.

15. Exterior vehicle light unit according to claim 14, wherein at least one mounting structure is formed as a heat discharge structure.

16. Exterior vehicle light unit, comprising:
    at least one lighting structure according to claim 1,
    at least one mounting structure, with each of the at least one lighting structure being mounted to at least one of the at least one mounting structure, and
    a lens cover.

17. Exterior vehicle light unit according to claim 16, wherein the at least one mounting structure is formed as a heat discharge structure.

18. Aircraft having at least one exterior vehicle light unit according to claim 16.

19. Lighting structure according to claim 1, wherein the first output region corresponds to a first angular range of between 75° and 85°, when seen from the light source, in a cross-sectional plane orthogonal to the aspherical collimating lens and going through the light source.

20. Lighting structure according to claim 1, wherein the second output region corresponds to a second angular range of between 50° and 60°, when seen from the light source, in a cross-sectional plane orthogonal to the aspherical collimating lens and going through the light source.

* * * * *